United States Patent [19] [11] 3,964,922
Nishida et al. [45] June 22, 1976

[54] PROCESS FOR CALCINATION OF CEMENT-CLINKER

[75] Inventors: Toyomi Nishida; Hiroshi Sohma; Hayami Ito, all of Hyogo, Japan

[73] Assignee: Kawasaki Jukogyo Kabushiki Kaisha, Kobe, Japan

[22] Filed: May 22, 1974

[21] Appl. No.: 472,326

Related U.S. Application Data

[62] Division of Ser. No. 394,017, Sept. 4, 1973, Pat. No. 3,881,862.

[30] Foreign Application Priority Data

Sept. 4, 1972 Japan................................ 47-88536

[52] U.S. Cl. ............................................... 106/100
[51] Int. Cl.$^2$ ........................................... C04B 7/44
[58] Field of Search ..................................... 106/100

[56] References Cited
UNITED STATES PATENTS

| | | | |
|---|---|---|---|
| 2,469,989 | 5/1949 | Pyzel.................................. | 106/100 |
| 2,592,468 | 4/1952 | Rex et al............................. | 106/100 |
| 3,127,455 | 3/1964 | Culbertson et al. ................. | 106/100 |

*Primary Examiner*—J. Poer
*Attorney, Agent, or Firm*—Sughrue, Rothwell, Mion, Zinn & Macpeak

[57] ABSTRACT

A process is disclosed for calcining cement-clinkers by using a calcination apparatus having a generally cylindrical calcining furnace which is composed of (a) a throat part, (b) a spouted bed and (c) an uppermost chamber longitudinally connected in series with an upper part of a combustion chamber having a separate heat source. The calcining apparatus is disposed between a suspension type raw material preheating device and rotary kiln or a fluidized bed calcining device wherein, cement raw materials, which have been partly calcined in the said raw material preheating device, are fed in the vicinity of the upper end of the said spouted bed while a jet fluid of a high temperature flue gas passing through the throat part under high speed from the said combustion chamber and rising upwards is admixed with a tangential flow of a high temperature exhaust gas introduced into the vicinity of the upper end of the said spouted bed from the said rotary kiln or from the fluidized bed calcining device. This forms a vigorously admixed and dispersed tangential flow zone where the calcination and heat exchange of the cement raw materials are carried out in the central part of the said calcining furnace and a returning swirl flow zone of a relatively low temperature falling downwards together with non-calcined cement raw materials in the vicinity of the surface of the inner wall of the said calcining furnace; and powders of completely calcined cement raw materials are selectively exhausted together with the exhaust flue gas from the vicinity of the top part of the said calcining furnace and are transported to the rotary kiln or the fluidized bed calcining device.

4 Claims, 1 Drawing Figure

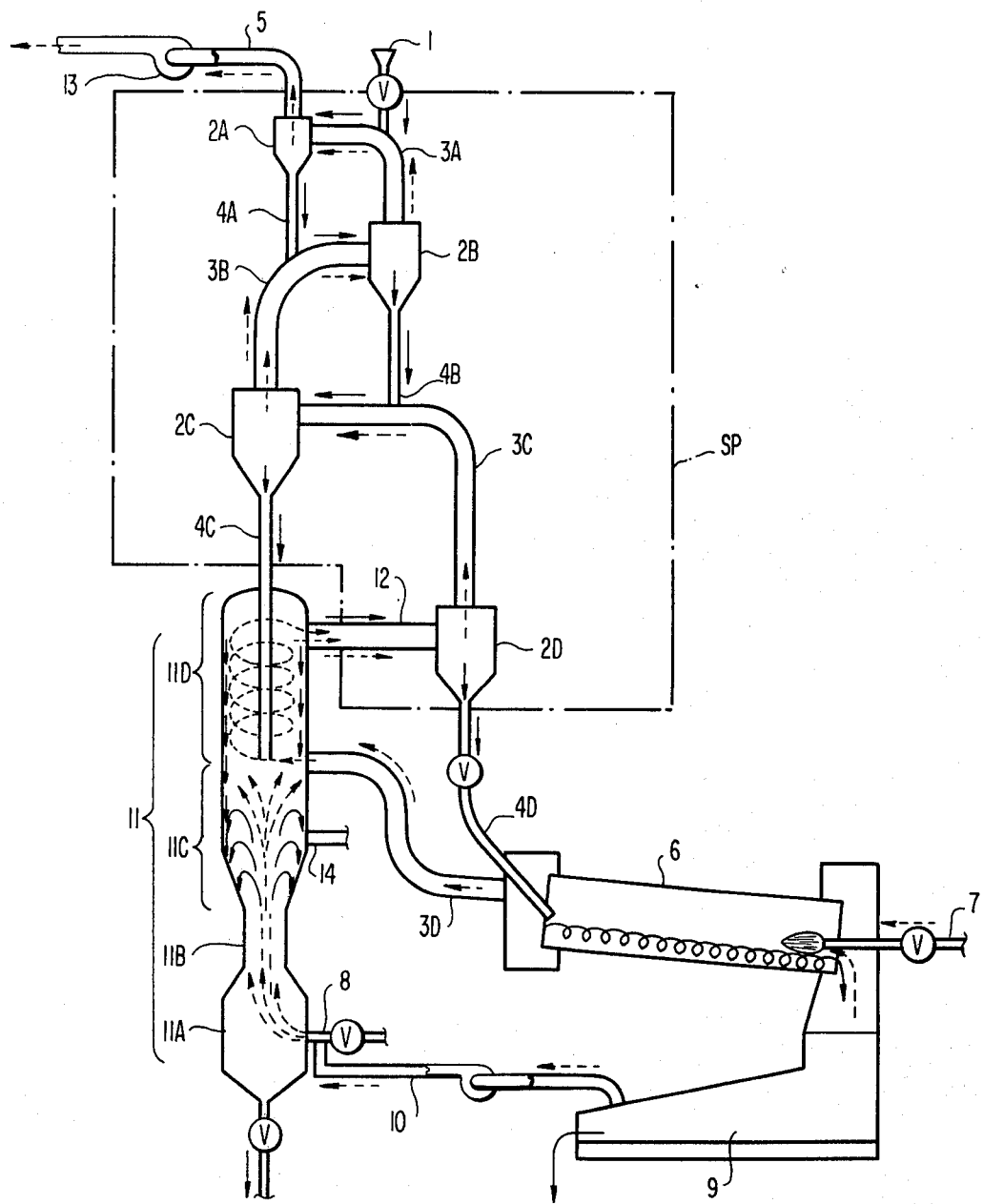

PROCESS FOR CALCINATION OF CEMENT-CLINKER

This is a division of application Ser. No. 394,017 filed Sept. 4, 1973, now U.S. Pat. No. 3,881,862.

BACKGROUND OF THE INVENTION

1. Field of the Invention

This invention relates to improvements in a process for calcination of cement-clinkers.

2. Description of the Prior Art

As well known, at least two operations for calcination (decomposition) of limestone as a main raw material — endothermic reaction — and calcination of clinker (narrow sense) — exothermic reaction — are necessary in the production of cement-clinkers, and a major part of heat consumption amount in the calcination of cement (broad sense) is occupied by the said former calcination reaction including the heating of the raw materials.

Now, according to the cement calcination process to be carried out by means of a combination consisting of a suspension type raw material preheating apparatus and a rotary kiln, the cement raw material is preheated before being fed into the rotary kiln, while the calcination of the limestone in the raw material is simultaneously effected in some degree, and therefore it is true that a fairly good result can be attained in the said calcination process in the point of economization of combustion heat and of improvement of specific efficiency of rotary kiln.

In the said type of calcination process, however, the quantity of heat of the rotary kiln exhaust gas to be introduced into the raw material preheating apparatus is limited in relation to the temperature in the interior of the rotary kiln and to the problem on adhesion and growth of molten substances, and so, it is in general difficult to make the percentage of real calcination of the raw material in the said preheating apparatus about 40% or more, and the calcination of the remaining non-decomposed raw material of about 60% or more is to be effected in the rotary kiln or in a fluidized bed calcining device.

Accordingly, the calcination zone for effecting the supply of heat for the calcination reaction must inevitably be made long, and thus the size of the rotary kiln is necessarily made long thereby to prolong the retention time of raw material in the long rotary kiln. On these grounds, the said type of calcination process is defective and disadvantageous in that the operation is often interrupted or even made impossible due to various unfavorable phenomena occurring in accordance with the said prolonged retention time, such as increase of combustion heat, evaporation of alkali content, adhesion, growth and condensation of molten raw material in the flue and on the wall of apparatus.

In order to overcome such defect and disadvantage, a new type of calcination of cement-clinkers has been proposed where a calcining device having a separate heat source is combined with the rotary kiln or a fluidized bed calcining device to be used in place thereof and with the suspension type raw material preheating apparatus, and the limestone in the raw material is, after being almost completely calcined in the said calcining device, transported to the rotary kiln or to the fluidized bed calcining apparatus while kept at a high temperature.

SUMMARY OF THE INVENTION

The object of the present invention is to provide and improved process for calcination of cement-clinkers.

The constitution and the effect of the present invention to attain the object will be understood from the detailed description to follow.

BRIEF EXPLANATION OF THE DRAWING

The FIGURE is a schematic side view showing one embodiment of the present invention.

DESCRIPTION OF PREFERRED EMBODIMENT

Now, the present invention will be explained in detail with reference to the drawing. 1 is a raw material hopper, 2A through 2D are cyclones, 3A through 3D are exhaust flue gas ducts, 4A through 4D are raw material inlet ducts, 5 is an exhaust gas outlet duct, 6 is a rotary kiln, 7 and 8 burners, 9 is a clinker cooler, 10 is a compressed combustion air feeding shoot pipe, and 11 is a generally cylindrical spouted bed type calcining furnace. The said furnace 11 is composed of a combustion chamber 11A provided with a separate heat source or a burner 8 and a compressed combustion air feeding shoot pipe 10, and of a throat part 11B, a spouted bed 11C provided with the burners 14 and an uppermost chamber 11D longitudinally connected in this order with the upper end of the said combustion chamber 11A. 12 is an outlet duct for exhausting a mixture consisting of raw material powders which have been almost completely calcined in the said calcining furnace 11 and of an exhaust flue gas, and the said duct 12 connects the vicinity of the top of the said uppermost chamber 11D and the inlet side of the lower-most cyclone 2D disposed nearest to the inlet of the rotary kiln 6.

Cement raw material powders which have been previously well admixed and which have been fed to the suspension type raw material preheating apparatus SP from the raw material hopper 1 are transported to the vicinity of the lower end portion of the uppermost chamber 11D of the spouted bed type calcining furnace 11 or to the vicinity of the upper end portion of the spouted bed 11C of the said furnace 11, via the course of exhaust flue gas duct 3A → cyclone 2A → raw material duct 4A → exhaust gas duct 3B → cyclone 2B → raw material duct 4B → exhaust gas duct 3C → cyclone 2C → raw material duct 4C, as shown by the arrows in the drawing, while the thus fed cement raw material powders are preheated to about 600°–700°C in the raw material preheating apparatus SP, due to heat exhange with a high temperature exhaust flue gas which passes through the course of duct 12 → cyclone 2D → exhaust gas duct 3C → cyclone 2C → exhaust gas duct 3B → cyclone 2B → exhaust gas duct 3A → cyclone 2A, as shown by the dotted arrows in the drawing, and is finally exhausted in air via an exhaust gas outlet duct 5, an inducing blower 13 and a Cottrell precipitator (not shown), and the limestone content in the raw material is calcined in the degree of up to about 20–40%.

To the combustion chamber 11A of the spouted bed type calcining furnace 11 which is disposed between the rotary kiln 6 and the suspension type raw material heating apparatus SP is fed a fuel such as heavy oil or gas, which is gushed via the burner 8 together with a combustion air of relatively high temperature (about 350°–800°C) extracted from the clinker cooler 9 and transported under pressure through the pipe 10.

A high temperature flue gas of about 1300°–1700°C generated in the combustion chamber 11A after complete combustion passes in a high speed through the throat part 11B, and the major flow thereof further passes through the central part of the enlarged part or the spouted bed 11C and rises upwards while a part thereof returns as a swirling flow.

During the passing of the said high temperature flue gas, the gas is efficiently brought into contact with the raw material powders which, as mentioned above, have been preheated to about 600°–900°C in the raw material preheating apparatus SP and have been fed in the vicinity of the upper end part of the spouted bed 11C via the raw material duct 4C in the appropriately calcined state and are falling downwards in the said chamber.

In the central part of the said enlarged part is formed a vigorous jet zone layer, and so the raw material powders falling therethrough are fully contacted with the high temperature flue gas in the said jet zone to absorb the consumption heat of the said gas and thus are heated up to an optimum temperature (about 850°–950°C) for carrying out the calcination reaction and kept as such, and accordingly, the calcination reaction of the raw material powders proceeds rapidly with the result that the temperature of the major flow of the flue gas which rises upwards is lowered in the vicinity of the upper end part of the spouted bed 11C to become about 900°–1050°C which is near to the temperature of the raw material powders.

The said major flow of the flue gas is admixed with the exhaust flue gas (temperature: about 900°–1100°C) of the rotary kiln 6 introduced through the exhaust gas duct 3D which is disposed in the wall of the calcining furnace in the vicinity of the upper end portion of the spouted bed 11C and opens tangentially through the wall and almost perpendicular to the central axis of the said furnace, to form a tangential flow of about 800°–1000°C having sufficient flow speed and flow rate. Afterwards, the thus formed gas mixture flow being accompanied with the raw material powders, which have been almost completely calcined mainly in the spouted bed 11C provided with the burners 14 and the apparent particle size and the apparent specific gravity of which have thus been reduced, rises further upwards, and thereafter is exhausted from the outlet previously provided on the wall of the calcining furnace in the vicinity of the top end portion of the uppermost chamber 11D thereof, in the tangential direction almost perpendicular to the central axis of the said furnace, while further increasing the power of the said tangential flow rate, and then finally is introduced into the lowermost cyclone 2D via the duct 12. In the said cyclone 2D the raw material powders are separated from the gas mixture and are introduced into the rotary kiln 6 via the raw material duct 4D, while the exhaust flue gas from which the raw materials have been removed rises, as mentioned above, upwards in the raw material preheating apparatus passing through the exhaust gas duct 3C from the cyclone 2D. During the rising of the said flue gas in the said preheating apparatus, the said gas is brought into contact with the cement raw material powders fed from the raw material hopper 1 to preheat the same and then is finally exhausted in air via the exhaust gas outlet duct 5, the inducing blower 13 and the Cottrell precipitator or the like.

Thus, the cement raw material powders introduced into the rotary kiln 6 after almost complete calcination are fully finally calcined with a high temperature combustion gas blown from the burner 7 to form clinkers, while being granulated, and thereafter cooled in the clinker cooler 9 and taken out therefrom as final products. Almost all the air used for cooling is blown as a combustion air together with a fuel to the combustion chamber 11A of the calcining furnace 11 from the burner 8 via the duct 10. The major flow of the high temperature flue gas passing through the throat part 11B under high speed after complete combustion in the combustion chamber 11A and rising upwards in the calcining furnace 11 straightforwardly rises, as mentioned above, through the central part of the enlarged part or the spouted bed 11C almost without directly contacting with the inner wall of the said chamber, and therefore, the cement raw material powders which have not as yet been calcined so much, or in other words, those of a relatively low temperature as yet having large apparent specific gravity and particle size, ride the falling flow and the returning swirl flow which have been formed in the uppermost chamber 11D and which are accompanied with an admixed and dispersed tangential flow, to fall downwards to the vicinity of the upper end part of the throat part 11B along the inner wall of the calcining furnace 11 while forming a layer, and then they are admixed together after induced with a high temperature ascending jet flow therein. This is a flow pattern in the calcining furnace.

Accordingly, the inner wall of the furnace in the upper part than the vicinity of the upper end part of the throat part 11B is protected with a gas flow of a relatively low temperature containing cement raw material powders, and thus any adhesion and growth of molten substances in the said inner wall may completely be prevented thereby.

In this connection, since the cement raw material is not introduced in the combustion chamber 11A (and the throat part 11B), it is unnecessary to control the temperature therein below the melting point of the raw material (about 1100°C), and after all, even if the said temperature is elevated to about 1300°–1700°C or so for effecting and achieving complete combustion reaction therein, any unfavorable phenomena do not occur at all.

In the spouted bed type calcining furnace 11 of the present invention, it is easy to optionally and preferably control the time necessary for the calcination reaction, by appropriately adjusting the flow rate and the flow speed of the high temperature flue gas which passes under high speed through the throat part 11B from the combustion chamber 11A and rises upwards.

It is known that raw material powders are dispersed in the form of separate granules after complete calcination, due to disappearance of the original aggregation state thereof, and thus not only the apparent particle size thereof is reduced but also the weight thereof is reduced to about 50–60% of the original weight, due to release of carbon dioxide gas, and further the apparent specific gravity thereof is also fairly reduced. In the present invention, various merits are attained, in addition to the said known effects, such as improvements on heat exchangeability between gas and cement raw material powders and prevention of short path of raw material powders as well as extremely high sieve effect, due to the use of the spouted bed type calcining furnace 11 having the specific construction such that the enlarged part or the spouted bed 11C and the uppermost chamber 11D are longitudinally connected with each other where the flowing state of each of gas and raw material powders as well as the temperature of atmosphere is different from each other, and therefore, it is easy particularly due to the said high sieve effect, to selectively take out only the completely calcined raw material powders from the top of the calcining furnace 11, while surely retaining the other non-calcined powders in the said calcining furnace until the determined reaction has been almost competely effected therein, in the form of combination with tangential flow and swirl flow.

In addition, the spouted bed type calcining furnace 11 of the present invention has other various merits such that the heat exchangeability thereof is far superior to that of the other conventional air transporting zone type or cyclone type calcining apparatus, that the apparatus may be made compact and that the flexibility on the operation is large.

As apparent from the above explanation, it is easily possible according to the process and apparatus of the present invention to efficiently carry out the calcination of limestone without any obstruction such as adhesion and growth of molten substances and the like, and to transport only the cement raw material of high temperature which has been almost completely (100%) calcined to the rotary kiln or to the fluidized bed calcining apparatus used instead of the former, and therefore, various economical simplification in operation may possibly be effected such as simplification (or making small) of the length and capacity of the rotary kiln to be used for the formation of cement-clinkers, or the simplification of the scale of the said rotary kiln, reduction of the necessary retention time for the raw material, economization of motive power and heat to be used and reduction of evaporated alkali content in the rotary kiln. Thus, the present invention is extremely advantageous in that the productivity of cements progressively increases due to the use of specific process and apparatus as claimed.

What is claimed is:

1. A process for calcining cement clinkers wherein a calcining furnace is provided between a preheating apparatus for suspension type raw material and a rotary kiln or a fluidizing calcination apparatus and the raw material is preheated in said preheating apparatus and then calcined in said calcining furnace, which comprises the steps of:
   a. introducing the preheated raw material particles into the calcining furnace;
   b. producing a combustion gas, in a combustion chamber having a separate heat source independent of the calcining apparatus, at a temperature above that required for calcining the most or the whole part of said preheated particles;
   c. introducing the combustion gas into the bottom of the calcining furnace in the form of high velocity flow at high temperature rising from the bottom of said calcining furnace, causing said combustion gas flow to rapidly expand to form a high velocity and high temperature flow in the center of said calcining furnace and a lower velocity flow of relatively lower temperature due to heat exchange with said preheated particles at the inner periphery of the surrounding wall, and introducing them into the upper part of said calcining furnace thereby reducing the velocity of the high velocity gas flow to cause the preheated particles riding on the high velocity and high temperature flow to rise from the bottom of said furnace to the upper part of said furnace while heating said raw materials to cause calcination, and classifying and separating them into lighter calcined particles and non-calcined heavier particles in the upper part of said furnace;
   d. exhausting the calcined lighter particles together with gas from the upper part of said furnace while causing the non-calcined heavier particles to fall down in the lower velocity flow along the inner surface of the surrounding wall of the furnace to the bottom of said furnace whereby the high velocity flow is established to produce the circulation of the non-calcined particles in said furnace for a sufficient time required for their calcination;
   e. separating the calcined particles from the gas; and
   f. passing the calcined cement particles into a calcination apparatus to form cement clinkers.

2. A process for calcining cement clinkers wherein a calcining furnace is provided between a preheating apparatus for suspension type raw material and a rotary kiln or a fluidizing calcination apparatus and the raw material is preheated in said preheating apparatus and then calcined in said calcining furnace, which comprises the steps of:
   a. introducing the preheated raw material particles into the calcining furnace;
   b. producing a combustion gas, in a combustion chamber having a separate heat source independent of the calcining apparatus;
   c. introducing the combustion gas into the bottom of said furnace in the form of a high velocity flow at high temperature rising from the bottom of said furnace so as to calcine a part of said preheated particles, causing the gas stream to rapidly expand to form a high velocity and high temperature flow in the center of said furnace and a lower velocity flow at relatively lower temperature due to heat exchange between said preheated particles at the inner surface of the surrounding wall and introducing them into the upper part of said calcining furnace thereby reducing the velocity as a whole;
   d. introducing gas exhausted from said calcination apparatus in the form of swirling flow into the longitudinal center of said furnace in order to cause further heat exchange and calcination of said particles riding on the high velocity rising flow and to classify them into non-calcined heavier raw material and calcined lighter raw material thereby causing the swirling flow to collide against and mix with said rising flow to establish a vigorous mixing and diffusing swirl above the calcinating temperature in the center of said furnace and establish a returning vortex at relatively lower temperature at the periphery of the surrounding wall of said furnace while applying heat exchange between said mixing swirl, and the incoming preheated particles
   e. exhausting the lighter calcined particles from the top of said furnace together with the rising gas flow, while the non-calcined heavier particles riding on said swirling flow are carried to the periphery of the surrounding wall of said furnace, causing them to fall down along said wall to the gas inlet for the high velocity flow at the bottom of said furnace and to rise again on said rising high velocity flow to the upper part and then subjected them to heat exchange, calcination and circulating in said furnace until they are reduced in weight to the lighter particles and exhausted;

f. separating the calcined particles from the gas; and g. passing the calcined cement particles into a calcination apparatus to form cement clinkers.

3. A process for calcining cement clinkers as defined in claim 2, comprising the further step of introducing air preheated to a temperature between 700°–800°C in a cement clinker cooling apparatus into said combustion chamber and wherein the combustion gas thereby produced is then used as the high velocity and high temperature flow rising from the bottom of said furnace.

4. A process for calcining cement clinkers as defined in claim 2 comprising the additional step of introducing gas from a burner heating source into a spouted chamber in the calcining furnace for the calcination of the particles independently of the combustion chamber provided at the lower part of the calcining furnace.

* * * * *